US011249827B2

(12) United States Patent
Khare et al.

(10) Patent No.: US 11,249,827 B2
(45) Date of Patent: Feb. 15, 2022

(54) MACHINE LEARNING REPOSITORY SERVICE

(71) Applicant: Amazon Technologies, Inc., Seattle, WA (US)

(72) Inventors: Vineet Khare, Redmond, WA (US); Alexander Johannes Smola, Sunnyvale, CA (US); Craig Wiley, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 174 days.

(21) Appl. No.: 16/799,443

(22) Filed: Feb. 24, 2020

(65) Prior Publication Data

US 2020/0192733 A1 Jun. 18, 2020

Related U.S. Application Data

(63) Continuation of application No. 15/919,178, filed on Mar. 12, 2018, now Pat. No. 10,572,321.

(51) Int. Cl.
| | |
|---|---|
| *G06F 9/44* | (2018.01) |
| *G06F 9/54* | (2006.01) |
| *G06F 9/50* | (2006.01) |
| *G06F 9/455* | (2018.01) |
| *G06N 20/00* | (2019.01) |
| *G06Q 10/00* | (2012.01) |

(52) U.S. Cl.
CPC .......... *G06F 9/547* (2013.01); *G06F 9/45558* (2013.01); *G06F 9/5027* (2013.01); *G06N 20/00* (2019.01); *G06Q 10/00* (2013.01); *G06F 2009/45575* (2013.01)

(58) Field of Classification Search
CPC ...................................................... G06F 9/547
USPC ...................................................... 719/330
See application file for complete search history.

(56) References Cited

U.S. PATENT DOCUMENTS

2003/0227487 A1 12/2003 Hugh
2008/0215456 A1* 9/2008 West .................. G06Q 30/0623
705/26.41

(Continued)

FOREIGN PATENT DOCUMENTS

KR 10-2017-0023168 A 3/2017

OTHER PUBLICATIONS

International Preliminary Reporton Patentability, PCT App. No. PCT/US2019/021645, dated Sep. 24, 2020, 8 pages.

(Continued)

*Primary Examiner* — Timothy A Mudrick
(74) *Attorney, Agent, or Firm* — Nicholson De Vos Webster & Elliott LLP

(57) ABSTRACT

Techniques for providing and servicing listed repository items such as algorithms, data, models, pipelines, and/or notebooks are described. In some examples, web services provider receives a request for a listed repository item from a requester, the request indicating at least a category of the repository item and each listing of a repository item includes an indication of a category that the listed repository item belongs to and a storage location of the listed repository item, determines a suggestion of at least one listed repository item based on the request, and provides the suggestion of the at least one listed repository item to the requester.

20 Claims, 14 Drawing Sheets

(56) References Cited

U.S. PATENT DOCUMENTS

2019/0044829 A1\* 2/2019 Balzer .................. G06N 20/00
2019/0114293 A1\* 4/2019 Li ..................... G06Q 30/0201

OTHER PUBLICATIONS

Office Action, EP App. No. 19714902.4, dated Jan. 28, 2021, 7 pages.
International Search Report and Written Opinion for International Application No. PCT/US2019/021645, dated May 8, 2019, 11 pages.
Notice of Allowance, U.S. Appl. No. 15/919,178, dated Oct. 24, 2019, 7 pages.
Non-Final Office Action, U.S. Appl. No. 15/919,178, dated May 30, 2019, 11 pages.

\* cited by examiner

LISTINGS
217

ALGORITHM 301
- CATEGORY:SUBCATEGORY
- API DEFINITION
- SUGGESTED RESOURCE REQUIREMENTS
- SUGGESTED TRAINING DATA
- RELATIVE USAGE IN CATEGORY:SUBCATEGORY
- STORAGE LOCATION

MODEL 303
- CATEGORY:SUBCATEGORY
- API DEFINITION
- SUGGESTED RESOURCE REQUIREMENTS
- RELATIVE USAGE IN CATEGORY:SUBCATEGORY
- ACCURACY
- STORAGE LOCATION
- LATENCY

DATA 305
- CATEGORY:SUBCATEGORY
- RESOURCE REQUIREMENTS
- RELATIVE USAGE IN CATEGORY:SUBCATEGORY
- STORAGE LOCATION

NOTEBOOK 307
- CATEGORY:SUBCATEGORY

PIPELINE 309
- CATEGORY:SUBCATEGORY
- SUGGESTED RESOURCE REQUIREMENTS
- RELATIVE USAGE IN CATEGORY:SUBCATEGORY
- ACCURACY
- STORAGE LOCATION
- LATENCY

*FIG. 3*

MACHINE LEARNING REPOSITORY SERVICE

CROSS-REFERENCE TO RELATED APPLICATIONS

This application is a continuation of U.S. application Ser. No. 15/919,178, filed Mar. 12, 2018, which is hereby incorporated by reference.

BACKGROUND

Machine learning and data analysis algorithms can be applied to many domains, ranging from medical image analysis to insurance, financial data (e.g. fraud detection), and social networks (e.g. image and text understanding, graph analysis). With advances in artificial intelligence and related applications more and more users are starting to engage with these systems.

BRIEF DESCRIPTION OF DRAWINGS

Various embodiments in accordance with the present disclosure will be described with reference to the drawings, in which:

FIG. 3 illustrates embodiments of formats of listings.

DETAILED DESCRIPTION

Various embodiments of methods, apparatus, systems, and non-transitory computer-readable storage media for a machine learning content repository service are described. Detailed herein are embodiments enabling producers of algorithms, models, pipelines, notebooks, and/or data (hereinafter "content") to provide their content to users.

Unfortunately, while the desire to use machine learning models/algorithms is high, not all programmers and/or system administrators have the time or requisite knowledge to produce this content or integrate it into a pipeline of actions. In embodiments detailed herein, producers who produce data, algorithms, and/or models make them available to third parties via a registry based system. Requesters search this register to find algorithms, models, and/or data for their own purposes. In some embodiments, one or more schemas are utilized to build machine learning pipelines using one or more of the algorithms, models, and/or data made available via the registry based system. The schemas enable a requester to build machine pipelines without the need to perform one or more of generating an algorithm, training an algorithm, generating or curating data for training, etc.

Figure 1:
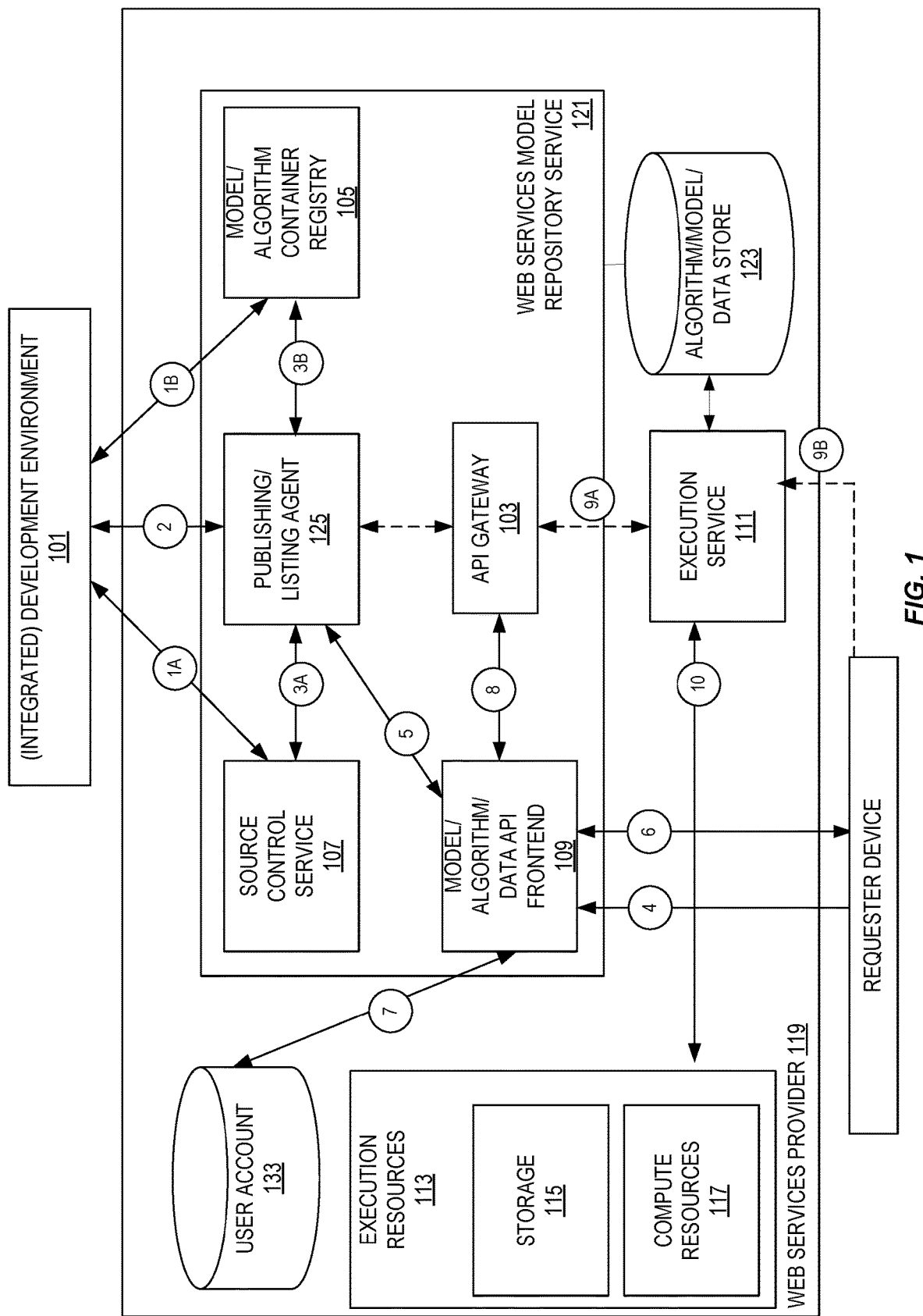
FIG. 1 illustrates examples of embodiments supporting suggesting and/or combining algorithm/model/data.

FIG. 1 illustrates examples of embodiments supporting suggesting and/or combining algorithm/model/data. As shown, a web services provider 119 includes many different services to support both the availability of third party content to a requester. Each of the components of the web services provider (other than storage) is software stored in memory and executing on hardware.

An (integrated) development environment 101 allows a producer to generate or otherwise provide content (algorithms, data, models, pipelines, notebooks, etc.) to be made available by a web services model repository service 121 of the web services provider 119. While shown outside of the web services provider 119, in some embodiments the (integrated) development environment 101 is service of the (integrated) development environment 101. In some embodiments, interpreted programming language support is provided to the (integrated) development environment 101.

In some embodiments, a producer is provided with multiple programming interfaces for interpreted languages, such as Ruby/Perl/R/Python, via the (integrated) development environment 101 to develop code which is then input into a source control service 107. The source control service 117 stores code, binaries, and/or metadata in a redundant fashion. The source control service 117 allows for collaboration with local and remote teams to edit, compare, sync, and/or revise stored code and track those actions. In some embodiments, the source control service 117 hosts code repositories of a third party. The source control service 117 encrypts the code, binaries, and/or metadata it stores and, in some embodiments, is coupled to, or includes, a permission system to dictate access to the code, binaries, and/or metadata stored. In some embodiments, a producer provides a few unit test cases (inputs and outputs) to be used in verification and testing. In some embodiments, a producer provides a container to the web services model repository service 121 using a model/algorithm container registry 105. This container is shared as an image. In some embodiments, a model/algorithm container registry 105 is a fully-managed container registry that allows for storing, managing, and deploying of container images.

The web services model repository service 121 allows for a producer to share generated content with others. The content that is shared is searchable as listings. In particular, a requester interfaces with a model/algorithm/data application programming interface (API) frontend 109 to find and select shared content through requests serviced by a publishing/listing agent 125. In some embodiments, the API frontend 109 tracks which requests did not get a satisfactory result (no selection is made or no result generated). In some embodiments, unsatisfactory results are used to prompt producers for content.

The publishing/listing agent 125 publishes received code or containers, lists containers, and responds to queries. Each of these actions are detailed more below. Published algorithms, models, and data are stored in algorithm/model/data store 123 (of course, this storage may be spread across many physical devices). The store 123 may also store pipelines and/or notebooks.

Further, in some embodiments, the publishing/listing agent 125 is used by a requester to build a pipeline and/or cause execution or training of a selected model or algorithm using execution resources 113 (hardware compute resources 117 and storage 115) via an execution service 111. In some embodiments, the execution resources 113 use virtualization as detailed below. In some embodiments, container images include one or more layers, where each layer represents executable instructions. Some or all of the executable instructions together represent an algorithm that defines a machine learning model. The executable instructions (e.g., the algorithm) can be written in any programming language (e.g., Python, Ruby, C++, Java, etc.). In some embodiments, the virtual machine instances are utilized to containers. In some embodiments, each virtual machine instance includes an operating system (OS), a language runtime, and one or more machine learning (ML) training containers 130.

A user account 133 per producer and requester stores information about what content been shared and what content being used. Further, in some embodiments, a pipeline is stored in a user account 133. The user account 133 is accessed through the frontend 109.

In some embodiments, the web services model repository service 121 is as one or more virtual machines running one or more hosts. In some embodiments, the web services model repository service 121 is load balanced to handle more or less traffic using more optimal hardware configurations.

Security is important to both producers and requesters. In particular, data provided by the user is treated securely and responses of the algorithms are not malicious. As most ML models will require access to data, models, libraries, and other algorithms, in some embodiments, a model or algorithm may use (1) other users' data/models that are stored (externally or within the web services provider) (2) only the requesting users' data/models stored for the requesting user (externally or within the web services provider. In some embodiments, data sent by the requesters is not shared or exfiltrated. Regardless of how a producer provides content, there may be several security concerns for producers relating to guarding against theft of code due to malicious intent by the consumer. As an example, consider a scenario where a consumer passes an input file to an algorithm that creates a core dump and executes a malicious code that makes a tar ball of the state and sends it back to the requester. In other words, this is a generalization of S3 injection. In some embodiments, this is countered by using well-defined APIs, enforcing a consistency check, and/or restricting the ways by which an application may communicate. Additionally, in some embodiments, to prevent abusive results, in some embodiments output is filtered by task such that output not relevant to the task is not shared (for example, output could be relevant for speech recognition, but not so relevant for multiclass and is therefore not shared).

FIG. 1 also includes circles with numbers inside. These indicate potential actions that may occur. At circles 1A and 1B, a producer shares code and containers respectively to be published. At circle 2, a request is made to publish and list the code or container. At circles 3A and 3B, the publishing/listing agent 125 performs actions for publishing and listing.

At circle 4 a requester makes a request (query) for content. This request is received by the model/algorithm/data application programming interface (API) frontend 109 and forwarded to the publishing/listing agent 125. The publishing/listing agent 125 checks its listings and provides a result at circle 5. In some embodiments, the user account 113 for the requester is accessed to see what the requester is allowed to access in terms of hardware, etc.

The requester selects content from the result and provides this selection and/or code using this selection at circle 6. In some embodiments, interaction also includes a request to execute or train. In some embodiments, the publishing/listing agent 125 selects what it feels is best and merely alerts the requester as to the selection. In some embodiments, the user account 113 for the requester is accessed at circle 7 to pull a pipeline that the selected content is to be a part of and the selection and pipeline are forwarded to the publishing/listing agent 125.

In some embodiments, an API gateway 103 takes in a request at circle 8 to start execution (e.g., inference) or training by an execution service 111. The API gateway 103 instructs the execution service 111 at circle 9A. In some embodiments, the publishing/listing agent 125 acts as an intermediary between the frontend 109 and the API gateway 103 and fills in a provided pipeline with the selection prior to the instruction to the execution service 111 to execute the pipeline or training of components thereof. The execution service 111 access the selected algorithm, model, and/or data in data store 123 to use a copy of the selection (an instance) to be used in the execution or training, and starts execution at circle 10. In some embodiments, the requester makes a direct request to the execution service 111 to start execution (e.g., inference) or training at circle 10. Further, in some embodiments, the execution service 111 provides execution metrics back to the publishing/listing agent 125.

Figure 2:
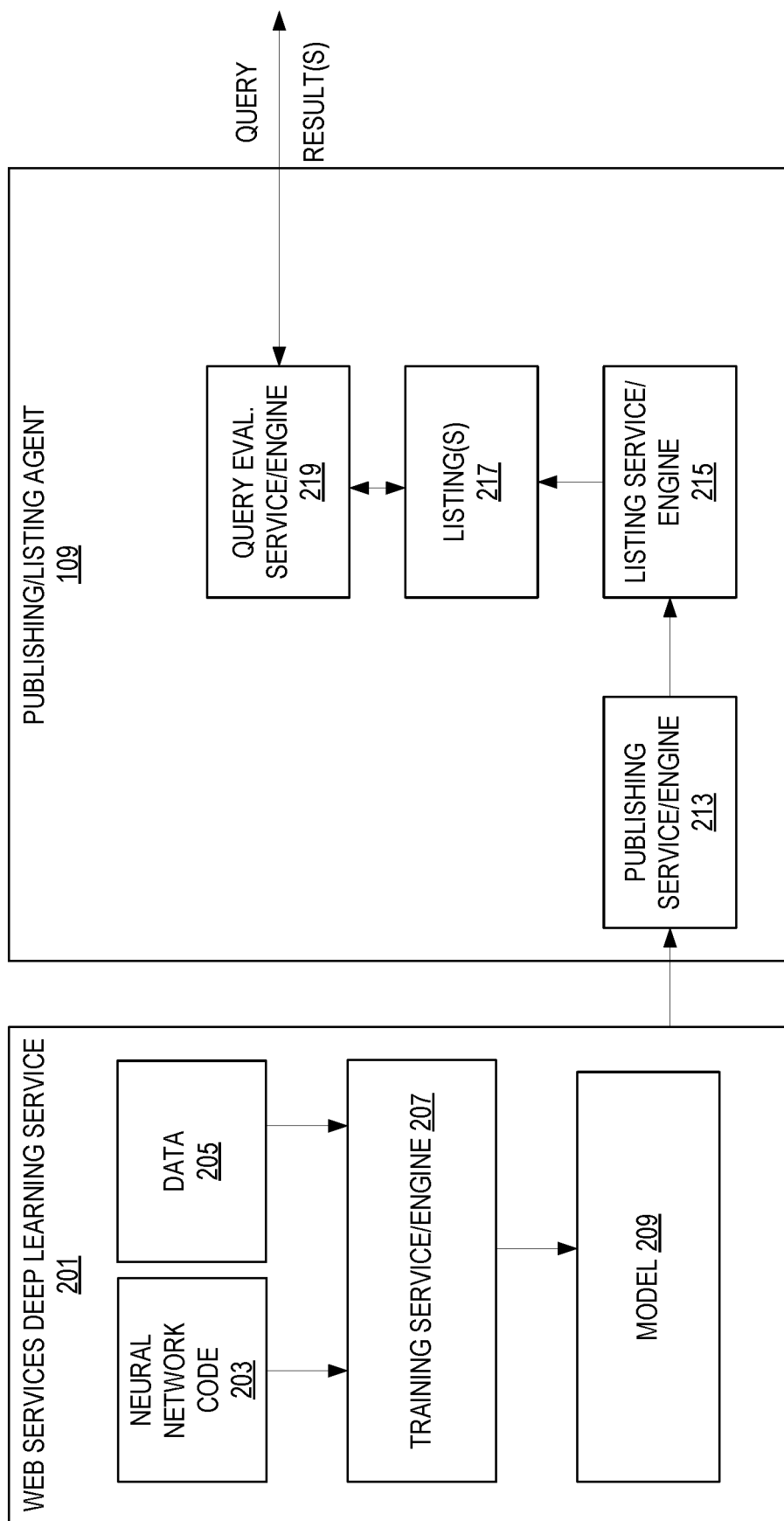
FIG. 2 illustrates embodiments of components of a publishing/listing agent and how they interact with a trained model.

FIG. 2 illustrates embodiments of components of a publishing/listing agent and how they interact with a trained model. In this illustration, a web services deep learning service 201 (for example, web services machine learning model developer service 401) utilizes neural network code (algorithm) 203 and training data 205 to perform training using a training engine 207 to produce a model 209. For example, a producer uses this service to train a model 209 to be made available through the publishing/listing agent 125. Note the components of the publishing/listing agent 125 similarly work with submitted algorithms, data, pipelines, etc.

The model 209 is provided to the publishing/listing agent 125. In some embodiments, the model 209 is supplied to a publishing service (or engine) 213 which publishes the model. Embodiments of actions of the publishing service (or engine) 213 are described with respect to FIGS. 5-6.

The next service/engine to be used is listing service (or engine) 215 which generates searchable listing of a plurality of listings 217. Embodiments of actions of the listing service (or engine) 215 are described with respect to FIG. 7.

A request query comes into the publishing/listing agent 125 into a query evaluation service (or engine) 219. A query may include one or more of: a category (and subcategory), data information (format of what is available to the requester), resource availability (what resources are available for use such as a processor type), timing information (such as desired latency), an indication of a pipeline that the model/algorithm/data is to be used for), accuracy desired, type of content desired (algorithm, model, and/or data), etc.

The query evaluation service (or engine) 219 evaluates for a received query to determine which listing(s) to suggest. For example, the query evaluation service (or engine) 219 looks at listing(s) 217 and compares them to determine which one(s) match the query.

In some embodiments, the output includes information about the input/output in the form of a schema. For example, an exemplary schema for image analysis is as follows:
input: tuple {input-data, location}
   where input-data can be {text-snippet, image, video}
   where location (optional) can be one of {bounding box, text-window, video-frame-indices}
output: list of predictions where each prediction contains a tuple {input-data, value, location, confidence}
   where value can be one of {text, class, value, vector}
   where location (optional) can be one of {bounding box, text-window, video-frame-indices}
where confidence is a real number FIG. 3 illustrates embodiments of formats of listings. An algorithm listing format 301 includes one or more of: a category:subcategory (subcategories) of the algorithm, an API definition (input/output format), suggested resource requirements to train the algorithm, relative usage of the algorithm in the category:subcategory (subcategories), and a storage location of the algorithm (so that it can be hosted/used by the requester).

A model listing format 303 includes one or more of: a name, a category:subcategory (subcategories) of the model, an API definition (input/output format), suggested resource requirements to use the model, relative usage of the model in the category:subcategory (subcategories), accuracy of the model, latency of the model, and a storage location of the model (so that it can be hosted/used by the requester).

A data listing format 305 includes one or more of: a name, a category:subcategory (subcategories) of the data, resource requirements (size of the data), relative usage of the data in the category:subcategory (subcategories), and a storage location of the data (so that it can be hosted/used by the requester).

In some embodiments, a notebook listing 307 is provided and includes at least a category: subcategory.

A pipeline listing format 309 includes one or more of: a name, a category:subcategory (subcategories) of the model, suggested resource requirements to use the model, relative usage in the category:subcategory (subcategories), accuracy, latency, and a storage location (so that it can be hosted/used by the requester).

In some embodiments, one or more of the formats 301-309 include one or more of: a schema used, an indication of the producer, reviews, examples, a version, and documentation of usage.

Figure 4:
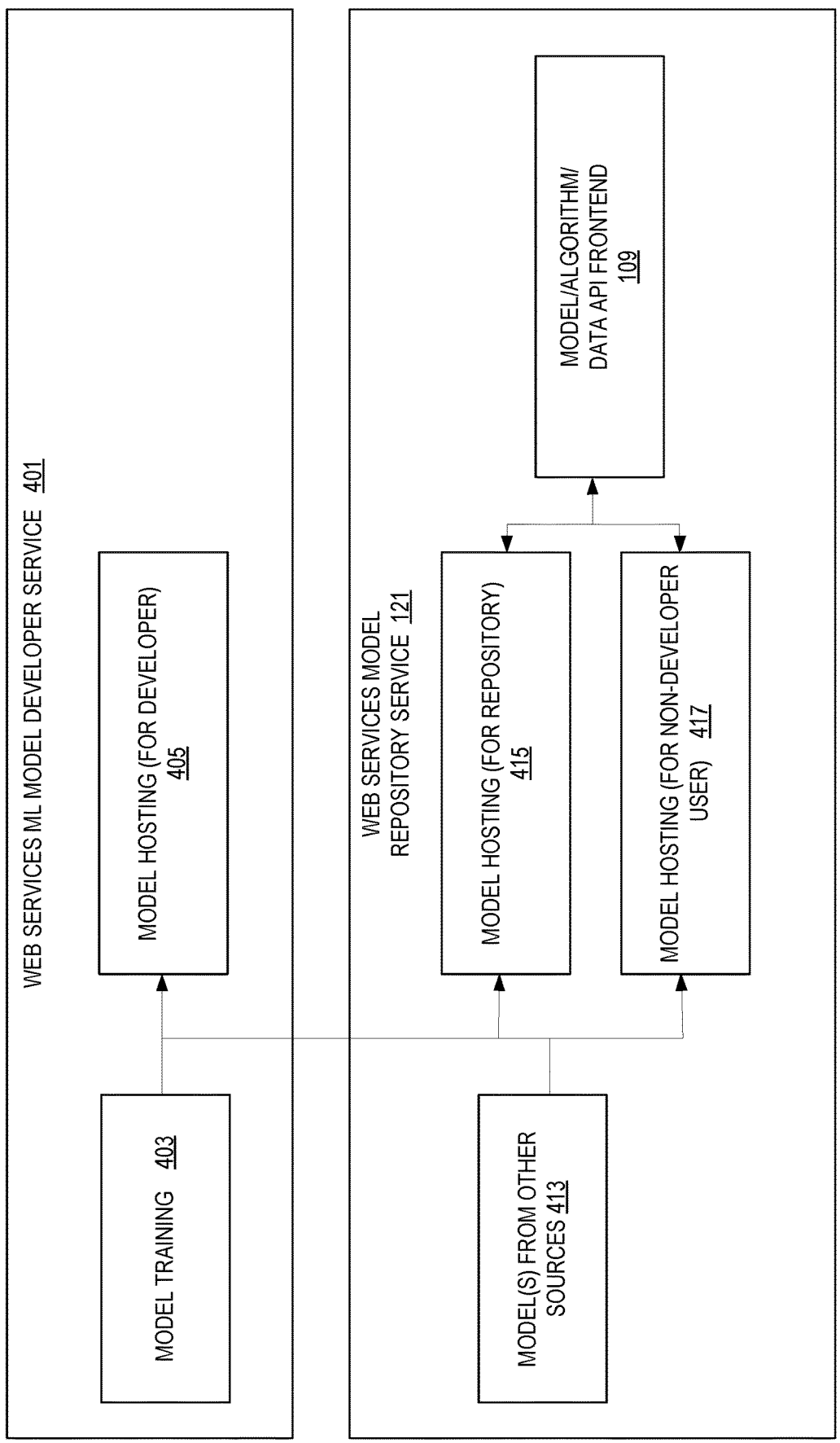
FIG. 4 illustrates an embodiment of interplay between a web services ML model developer service and a web services model repository service.

FIG. 4 illustrates an embodiment of interplay between a web services ML model developer service and a web services model repository service. In some embodiments, both the web services machine learning model developer service 401 and web services model repository service 121 are provided by the same web services provider (albeit, not necessarily on the same physical machine).

The web services machine learning model developer service 401 allows a ML model producer (developer) to train a model using the model training service 403. The resulting ML model may be hosted for the producer in the web services machine learning model developer service 401 such that the producer can utilize the trained ML model as the producer sees fit.

The resulting ML model may also be hosted by the web services model repository service 121 as discussed before. For example, the ML model trained using the model training service 403 can be searchable hosted 415 in the web services model repository service 121 and then hosted in an account for a non-developer user 417 based on a search query using the model/algorithm/data API frontend 109. Models from other sources 413 are also made available for model hosting (repository and use).

Figure 5:
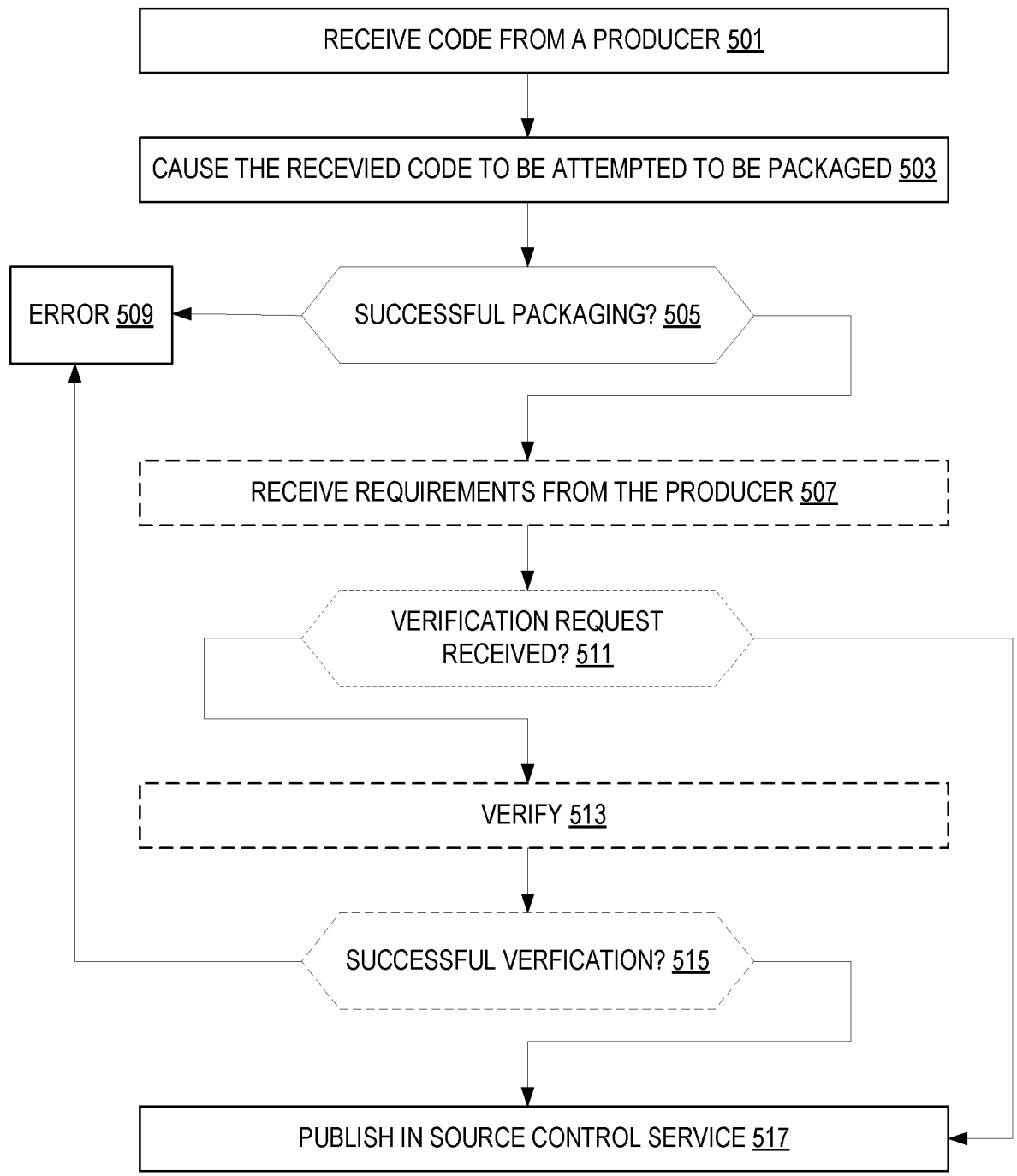
FIG. 5 illustrates embodiments of a method for publishing code to a source control service.

FIG. 5 illustrates embodiments of a method for publishing code to a source control service. In particular, the method is performed internally to a web services provider. In some embodiments, this method is performed by the publishing/listing agent 125. At 501 a potential code (algorithm or model) or data contribution from a producer is received by the web services provider.

Received code is caused to be packaged at 503. There are many ways to perform this packaging, but the end result is a package that is a compressed file (such as a zip, tar, etc.) consisting of the received code and any dependencies in some embodiments.

The package is tested at 505. For example, a check to see if the zip file (or tar, etc.) extracts correctly, contains uncorrupted data, etc. is made. When the packaging was unsuccessful, an error is generated at 509. For example, an error log is populated with the reason for the packaging failure.

In some embodiments, when the packaging was successful, requirements for using the code or data are received from the producer at 507. For example, the publishing/listing agent 125 is provided with hardware configurations to use, or encryption to adhere to, etc.

In some embodiments, a determination of if verification of the code or data has been requested by the producer has been received is made at 511. For example, did a producer ask that the web services provider verify received code is not malicious? Malicious code includes code that reports back usage to the producer including data used in running the code and/or results of running the code. Code that is deemed as not being malicious is one factor that may be used in determining what code to serve as a result of a requester query. In some embodiments, call signatures are used such that reference behavior is logged (and stored) to provide continual verification (such that code or data may be pulled).

In some embodiments, the producer specifies what is the maximum amount of time scoring can take. This timeout provides protection against malicious behavior to a certain extent, and for batch scoring requests are split into smaller batches to conform to the timeout specified by the producer.

At 513, a verification is caused to be performed when so requested. In some embodiments, the publishing/listing agent 125 performs this verification. In other embodiments, publishing/listing agent 125 calls another service to perform verification.

A determination of successful verification is made at 515 (when verification was performed). When the verification was not successful, an error is generated at 509. When the verification was successful, the package is published in the source control service 107 and 517. Published packages are available to the publishing/listing agent 125 to be served as a potential result to a code or data query.

Figure 6:
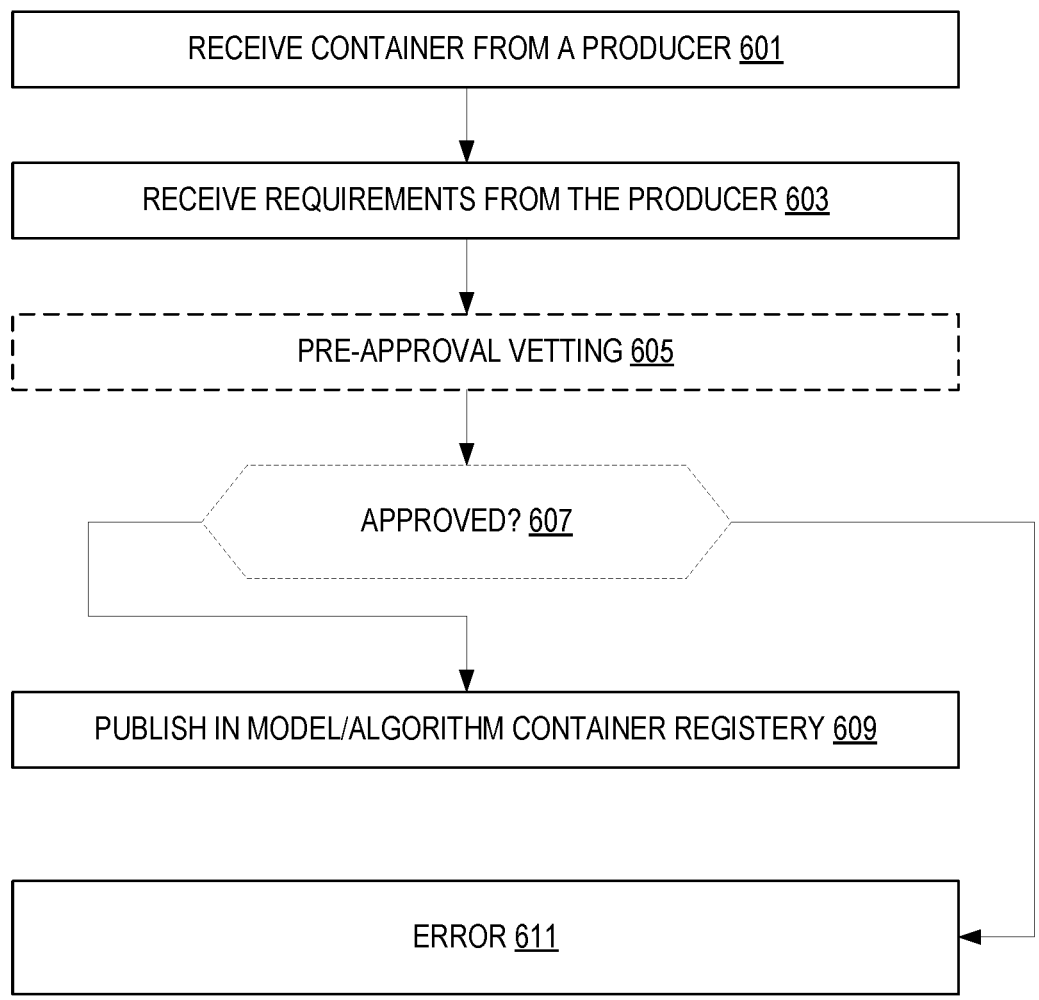
FIG. 6 illustrates embodiments of a method for publishing code to a model/algorithm container registry.

FIG. 6 illustrates embodiments of a method for publishing code to a model/algorithm container registry 105. In particular, the method is performed internally to a web services provider. In some embodiments, this method is performed by the publishing/listing agent 125.

At 601 a potential container (containing an algorithm or model) or data contribution from a producer is received by the web services provider.

In some embodiments, requirements for using the code or data are received from the producer at 603. For example, the publishing/listing agent 125 is provided with hardware configurations to use, or encryption to adhere to, etc.

In some embodiments, a pre-approval (verification) of the received container or data is made at 605. For example, did a producer ask that the web services provider verify received code is not malicious? Malicious code includes code that reports back usage to the producer including data used in running the code and/or results of running the code. Code that is deemed as not being malicious is one factor that may be used in determining what code to serve as a result of a requester query. In some embodiments, the publishing/listing agent 125 performs this verification. In other embodiments, publishing/listing agent 125 calls another service to perform verification. In some embodiments, call signatures are used such that reference behavior is logged (and stored) to provide continual verification (such that code or data may be pulled).

In some embodiments, the producer specifies what is the maximum amount of time scoring can take. This timeout provides protection against malicious behavior to a certain extent, and for batch scoring requests are split into smaller batches to conform to the timeout specified by the producer.

A determination of successful verification is made at 607 (when verification was performed). When the verification was not successful, an error is generated at 611. When the verification was successful, the package is published in the model/algorithm container registry 105. Published containers are available to the publishing/listing agent 125 to be served as a potential result to a code or data query.

Figure 7:
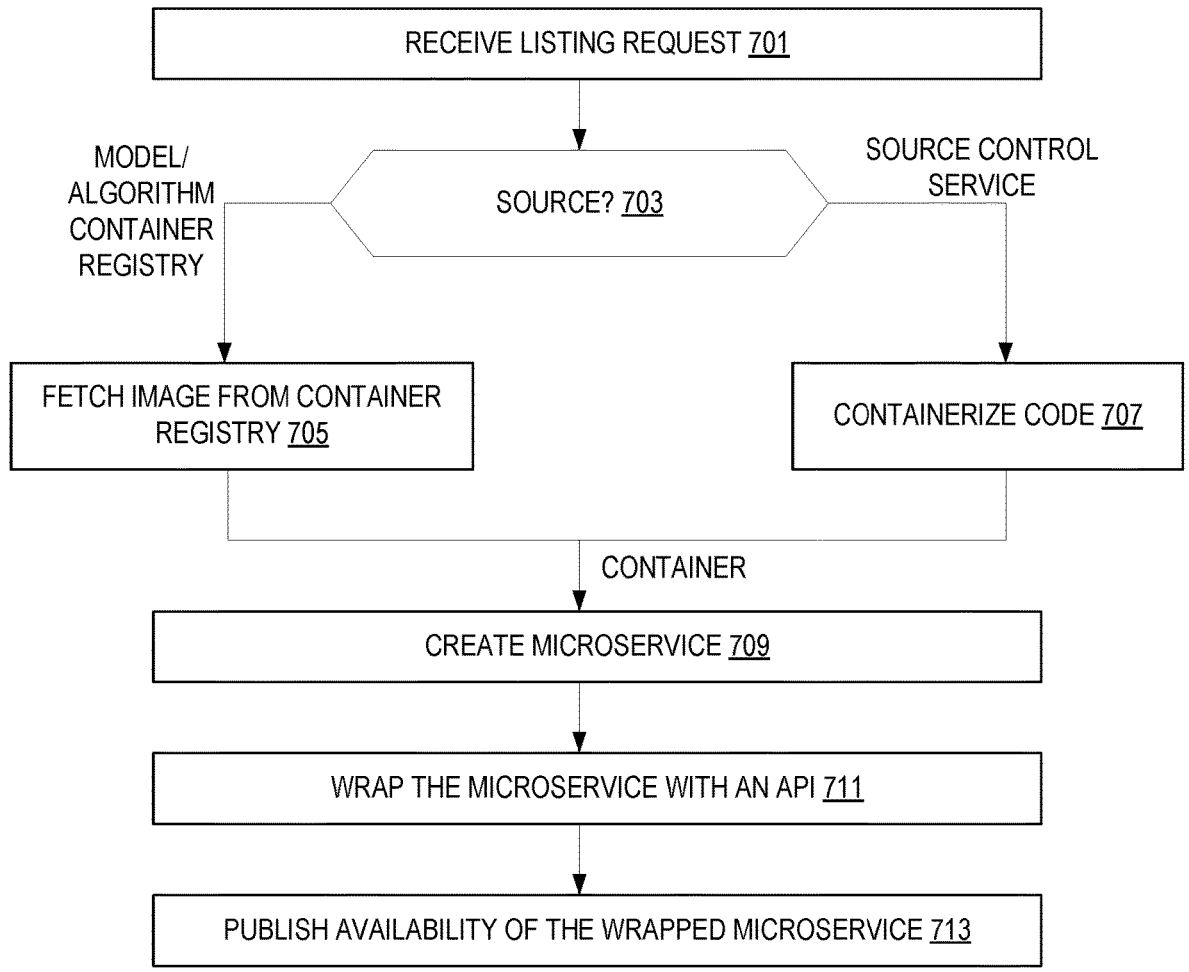
FIG. 7 illustrates embodiments of a method for listing producer code in a publishing/listing agent.

FIG. 7 illustrates embodiments of a method for listing producer code in a publishing/listing agent. In particular, the method is performed internally to a web services provider. In some embodiments, aspects of this method are performed by the publishing/listing agent 125.

A request to list a container is received at 701. For example, a producer requests that a container in the model/algorithm container registry 105 or package published in the source control service 107 is to be listed by the publishing/listing agent 125 as available for third party use.

At 703 a determination of what is the source of the code is made at 703. Is the code in the model/algorithm container registry 105 or in the source control service 107. Typically, the request 701 includes this location. However, in some embodiments, the request includes an identifier and a query is made to these entities to determine the location.

When the code is in the model/algorithm container registry 105, its image is fetched from the model/algorithm container registry 105. When the code is a part of a package stored in the source control service 107, the package is fetched and the package is containerized at 707.

Regardless of the source, a microservice, or microservices, for the container for the code of the request is caused to be made at 709. In some embodiments, the creation of the microservice is performed by the producer using compute resources 117. In other embodiments, the microservice creation is performed autonomously by the publishing/listing agent 125.

The microservice is wrapped with an API at 711. For example, input/output definitions are created such that an API call can be made.

The API wrapped microservice is published in the publishing/listing agent 125 at 713. At this point, a query for the code will return the API wrapped microservice which can be executed on execution resources 113 (and in some embodiments, using execution service 111 as an intermediary).

Figure 8:
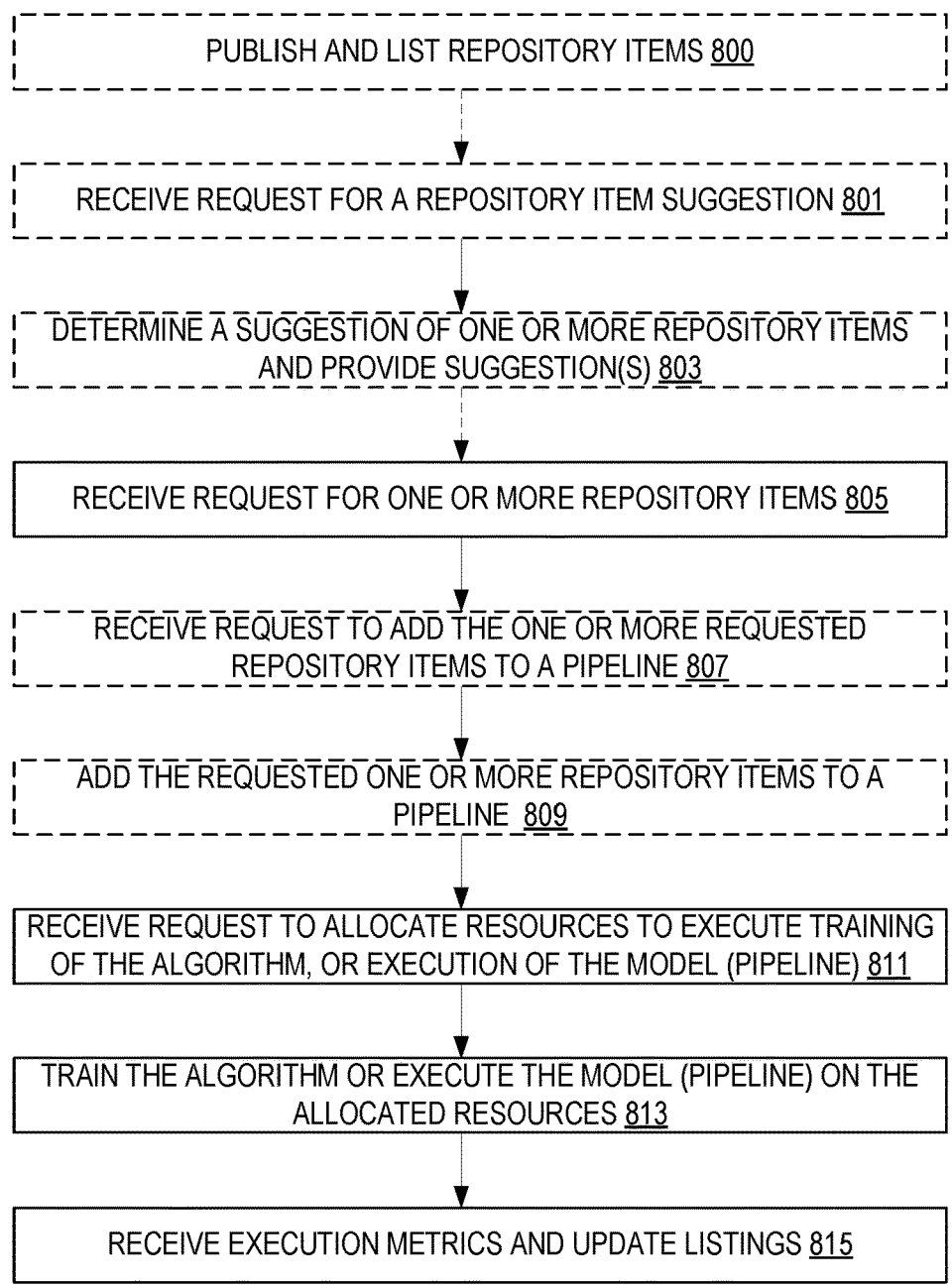
FIG. 8 illustrates embodiments of a method for handling a processing a query and executing a model/algorithm returned for the query.

FIG. 8 illustrates embodiments of a method for handling a processing a query and executing a model/algorithm returned for the query.

At 800, in some embodiments, repository items are published and listed. Examples of how to do this publishing and listing have been detailed above.

At 801, in some embodiments, a request is received for a listed repository item (algorithm/model/data/pipeline/notebook) suggestion. For example, a query such as that detailed with respect to FIG. 2 is received. Turning back to FIG. 1, the request is received via the model/algorithm/data API frontend 109 and passed to publishing/listing agent 125.

Using the details of the query, one or more listed repository items that may meet the desires of the query is determined and provided to the requester at 803 in some embodiments. Turning back to FIG. 1, the publishing/listing agent 125 performs this determination and then supplies a response to the requester via the model/algorithm/data API frontend 109.

At some point a request for a selected repository item is received at 805. Note that not all such requests are the direct result of a query. When the requester already knows which algorithm/model/data is desired, the acts of sending and receiving a query are likely not needed. Turning back to FIG. 1, the model/algorithm/data API frontend 109 receives this request for a repository item.

In some embodiments, a request to add the repository item to a ML pipeline is received at 807. For example, when the publishing/listing agent 125 is helping a user build a pipeline to perform a task (or tasks) this type of request occurs. The publishing/listing agent 125 will evaluate the pipeline as it exists and make the necessary connections within the pipeline at 809. In some embodiments, a pipeline is stored in a user account 133.

Once the requester has the algorithm, model, data, notebook, and/or pipeline it requested, resources are allocated (per a request from the request) to train the selected suggested algorithm(s), execute the selected model(s), or use selected data in training an algorithm at 611. The selected content may be a part of a pipeline and, in those cases, resources are allocated for the pipeline if it is ready for execution (for example, contains only models). For example, a request to perform one or more of these acts is received by the model/algorithm/data API frontend 109 which calls on the publishing/listing agent 125 to provide necessary information to an execution service 111 (such as a location of the selected algorithm, model, data, pipeline, and/or notebook in algorithm/model/data store 123) which then allocates execution resources 113 including compute resources 117 and storage 115. In some embodiments, the selected algorithm or model is a part of a container and a copy of the container is allocated to be executed. A copy is used instead of the original container so that the original container is not corrupted and/or the producer is not made aware of how the container is used.

Once the resources have been allocated the selected algorithm, model, data, notebook, and/or pipeline (and pipeline being used as needed) is trained or executed as desired at 813 using the allocated resources. For example, execution service 111 causes execution of a pipeline have a selected model, trains a selected algorithm using (selected) training data, etc. In some embodiments, different resources are allocated for different stages of the pipeline. These different resources are selected based on the information of the listing (such as suggested resource requirements, latency, etc.). Further, in some embodiments, different resources are selected based on what hardware resources are available to the requesting user.

Results of execution or training are reported back to the publishing/listing agent 125 so that the publishing/listing agent 125 can update the listings. For example, a listing is updated to reflect accuracy, latency, relative usage, etc.

Figure 9:
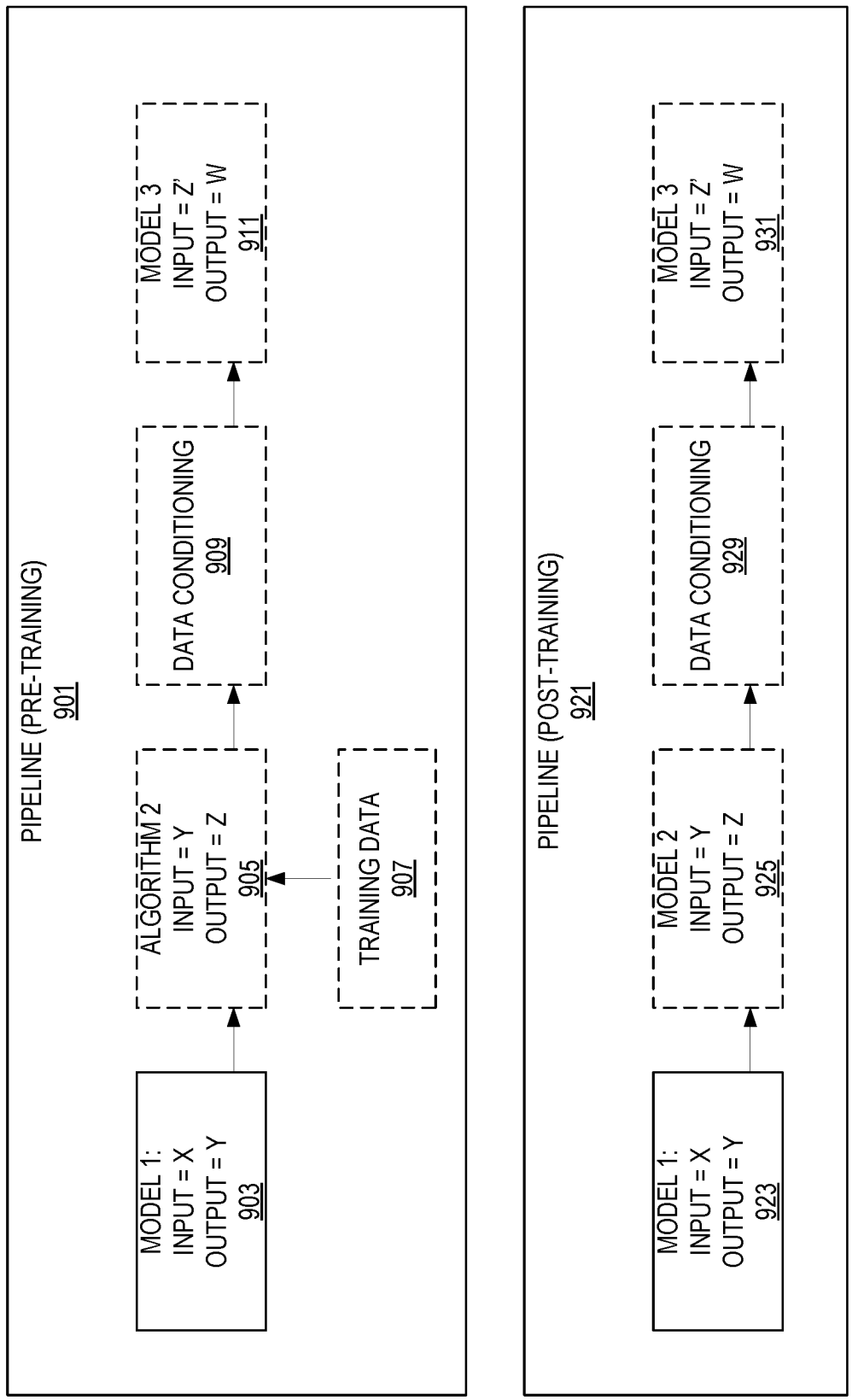
FIG. 9 illustrates embodiments of an exemplary pipeline (both pre- and post-training).

FIG. 9 illustrates embodiments of an exemplary pipeline (both pre- and post-training). In this example, dashed boxes indicate content that was suggested by a web services model repository service such as that detailed above. In some embodiments, at least some aspects of the organization of this pipeline have been made by the web services model repository service.

The pre-training pipeline 901 includes a first model (model 1) 903 that takes in data of format X and outputs data in format Y. The output (Y) of the model 1 903 is an input into algorithm 2 905. Algorithm 2 905 was an algorithm found as a result of a query to the web services model repository service that found an algorithm that would end up taking an input of format Y.

Before the algorithm 2 905 is used as a ML model, it must first be trained. Training data 907 is used for that purpose and this data 907 was also found as a result of the query.

The output of the model generated by training algorithm 2 905 is in the format of Z. As shown, the input into selected model 3 911 is Z'. In this example, the pre-training pipeline 901 requires an intermediary, data conditioning algorithm/model 909, between what will be model 2 and model 3 911, which conditions Z to be Z'. Z' is then fed into model 3 911.

The post-training pipeline 921 includes a first model (model 1) 923 that takes in data of format X and outputs data in format Y. The output (Y) of the model 1 903 is an input into model 2 925. The output of model 2 924 is fed to data the intermediary, data conditioning algorithm/model 929, which conditions Z to be Z'. Z' is then fed into model 3 931.

Figure 10:
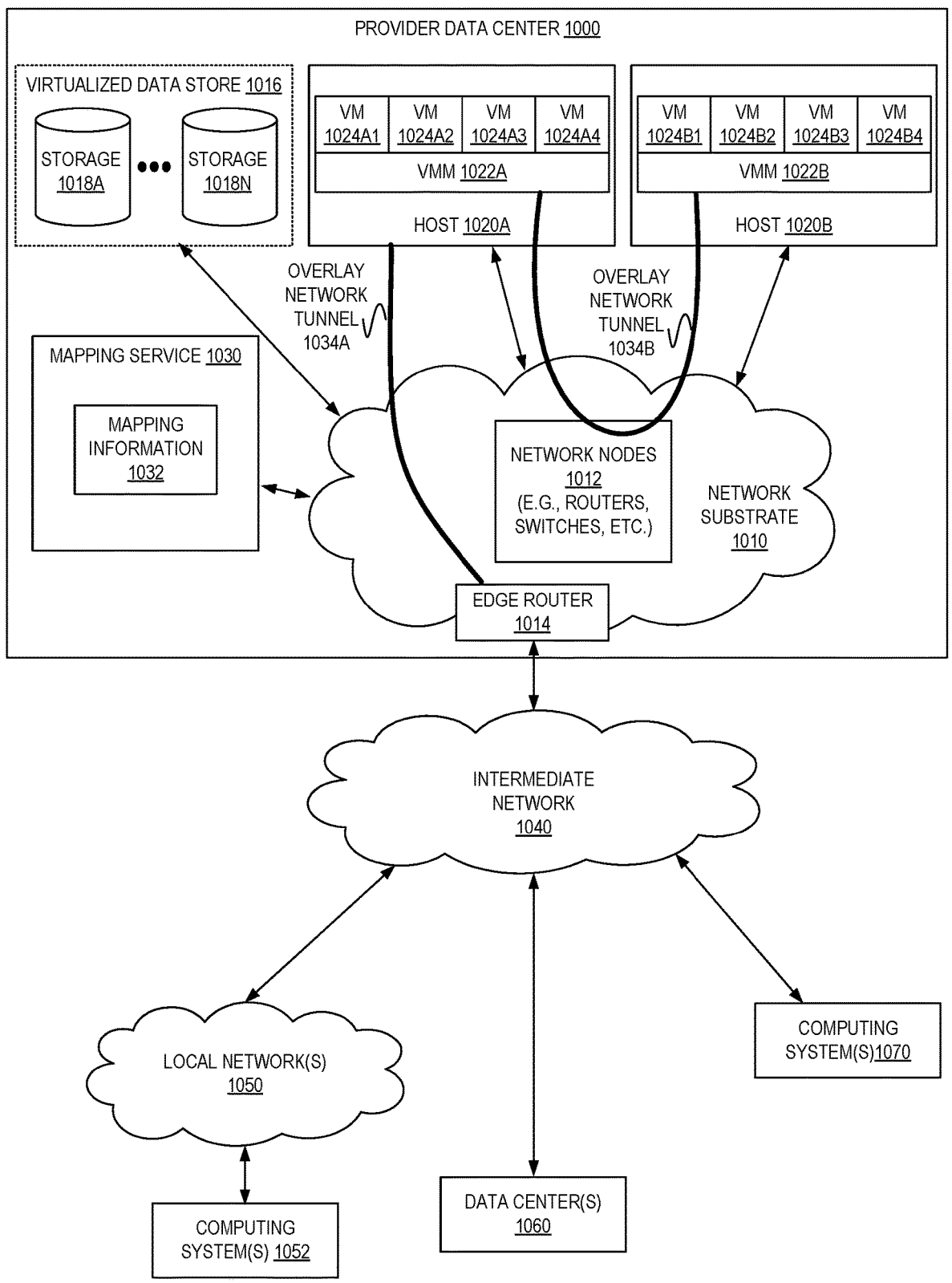
FIG. 10 illustrates an example data center that implements an overlay network on a network substrate using IP tunneling technology according to some embodiments.

FIG. 10 illustrates an example data center that implements an overlay network on a network substrate using IP tunneling technology, according to some embodiments. A provider data center 1000 may include a network substrate that includes networking nodes 1012 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 1010 using tunnels. The IP tunneling technology may provide a mapping and encapsulating system for creating an overlay network on a network (e.g., a local network in data center 1000 of FIG. 10) and may provide a separate namespace for the overlay layer (the public IP addresses) and the network substrate 1010 layer (the local IP addresses). Packets in the overlay layer may be checked against a mapping directory (e.g., provided by mapping service 1030) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 1030) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 10, an example overlay network tunnel 1034A from a virtual machine (VM) 1024A (of VMs 1024A1-1024A4, via VMM 1022A) on host 1020A to a device on the intermediate network 1050 and an example overlay network tunnel 1034B between a VM 1024A (of VMs 1024A1-1024A4, via VMM 1022A) on host 1020A and a VM 1024B (of VMs 1024B1-1024B4, via VMM 1022B) on host 1020B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 10, at least some networks in which embodiments may be implemented may include hardware virtualization technology that enables multiple operating systems to run concurrently on a host computer (e.g., hosts 1020A and 1020B of FIG. 10), i.e. as virtual machines (VMs) 1024 on the hosts 1020. The VMs 1024 may, for example, be executed in slots on the hosts 1020 that are rented or leased to customers of a network provider. A hypervisor, or virtual machine monitor (VMM) 1022, on a host 1020 presents the VMs 1024 on the host with a virtual platform and monitors the execution of the VMs 1024. Each VM 1024 may be provided with one or more local IP addresses; the VMM 1022 on a host 1020 may be aware of the local IP addresses of the VMs 1024 on the host. A mapping service 1030 may be aware of (e.g., via stored mapping information 1032) network IP prefixes and IP addresses of routers or other devices serving IP addresses on the local network. This includes the IP addresses of the VMMs 1022 serving multiple VMs 1024. The mapping service 1030 may be centralized, for example on a server system, or alternatively may be distributed among two or more server systems or other devices on the network. A network may, for example, use the mapping service technology and IP tunneling technology to, for example, route data packets between VMs 1024 on different hosts 1020 within the data center 1000 network; note that an interior gateway protocol (IGP) may be used to exchange routing information within such a local network.

In addition, a network such as the provider data center 1000 network (which is sometimes referred to as an autonomous system (AS)) may use the mapping service technology, IP tunneling technology, and routing service technology to route packets from the VMs 1024 to Internet destinations, and from Internet sources to the VMs 1024. Note that an external gateway protocol (EGP) or border gateway protocol (BGP) is typically used for Internet routing between sources and destinations on the Internet. FIG. 10 shows an example provider data center 1000 implementing a network that provides resource virtualization technology and that provides full Internet access via edge router(s) 1014 that connect to Internet transit providers, according to some embodiments. The provider data center 1000 may, for example, provide customers the ability to implement virtual computing systems (VMs 1024) via a hardware virtualization service and the ability to implement virtualized data stores 1016 on storage resources 1018A-1018N via a storage virtualization service.

The data center 1000 network may implement IP tunneling technology, mapping service technology, and a routing service technology to route traffic to and from virtualized resources, for example to route packets from the VMs 1024 on hosts 1020 in data center 1000 to Internet destinations, and from Internet sources to the VMs 1024. Internet sources and destinations may, for example, include computing systems 1070 connected to the intermediate network 1040 and computing systems 1052 connected to local networks 1050 that connect to the intermediate network 1040 (e.g., via edge router(s) 1014 that connect the network 1050 to Internet transit providers). The provider data center 1000 network may also route packets between resources in data center 1000, for example from a VM 1024 on a host 1020 in data center 1000 to other VMs 1024 on the same host or on other hosts 1020 in data center 1000.

A service provider that provides data center 1000 may also provide additional data center(s) 1060 that include hardware virtualization technology similar to data center 1000 and that may also be connected to intermediate network 1040. Packets may be forwarded from data center 1000 to other data centers 1060, for example from a VM 1024 on a host 1020 in data center 1000 to another VM on another host in another, similar data center 1060, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 1018A-1018N, as virtualized resources to customers of a network provider in a similar manner.

Figure 11:
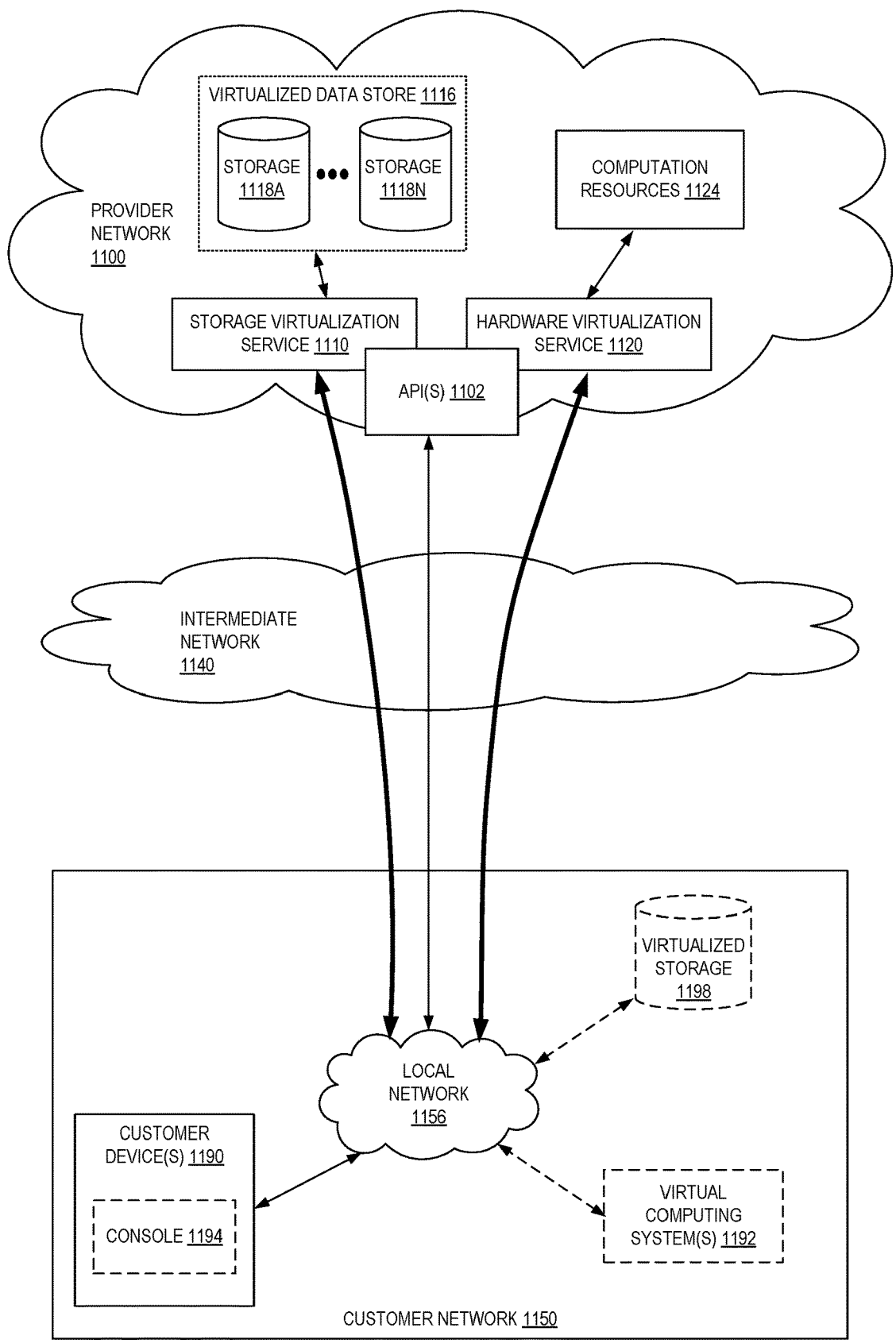
FIG. 11 is a block diagram of an example provider network that provides a storage virtualization service and a hardware virtualization service to customers according to some embodiments.

FIG. 11 is a block diagram of an example provider network that provides a storage virtualization service and a hardware virtualization service to customers, according to some embodiments. Hardware virtualization service 1120 provides multiple computation resources 1124 (e.g., VMs) to customers. The computation resources 1124 may, for example, be rented or leased to customers of the provider network 1100 (e.g., to a customer that implements customer network 1150). Each computation resource 1124 may be provided with one or more local IP addresses. Provider network 1100 may be configured to route packets from the local IP addresses of the computation resources 1124 to public Internet destinations, and from public Internet sources to the local IP addresses of computation resources 1124.

Provider network 1100 may provide a customer network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a customer network 1150 may access functionality provided by the hardware virtualization service 1120, for example via a console 1194 (e.g., a web-based application, standalone application, mobile application, etc.). In some embodiments, at the provider network 1100, each virtual computing system 1192 at customer network 1150 may correspond to a computation resource 1124 that is leased, rented, or otherwise provided to customer network 1150.

From an instance of a virtual computing system 1192 and/or another customer device 1190 (e.g., via console 1194), the customer may access the functionality of storage virtualization service 1110, for example via one or more APIs 1102, to access data from and store data to storage resources 1118A-1118N of a virtual data store 1116 provided by the provider network 1100. In some embodiments, a virtualized data store gateway (not shown) may be provided at the customer network 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In some embodiments, a user, via a virtual computing system 1192 and/or on another customer device 1190, may mount and access virtual data store 1116 volumes, which appear to the user as local virtualized storage 1198.

While not shown in FIG. 11, the virtualization service(s) may also be accessed from resource instances within the provider network 1100 via API(s) 1102. For example, a customer, appliance service provider, or other entity may access a virtualization service from within a respective virtual network on the provider network 1100 via an API 1102 to request allocation of one or more resource instances within the virtual network or within another virtual network.

Illustrative System

Figure 12:
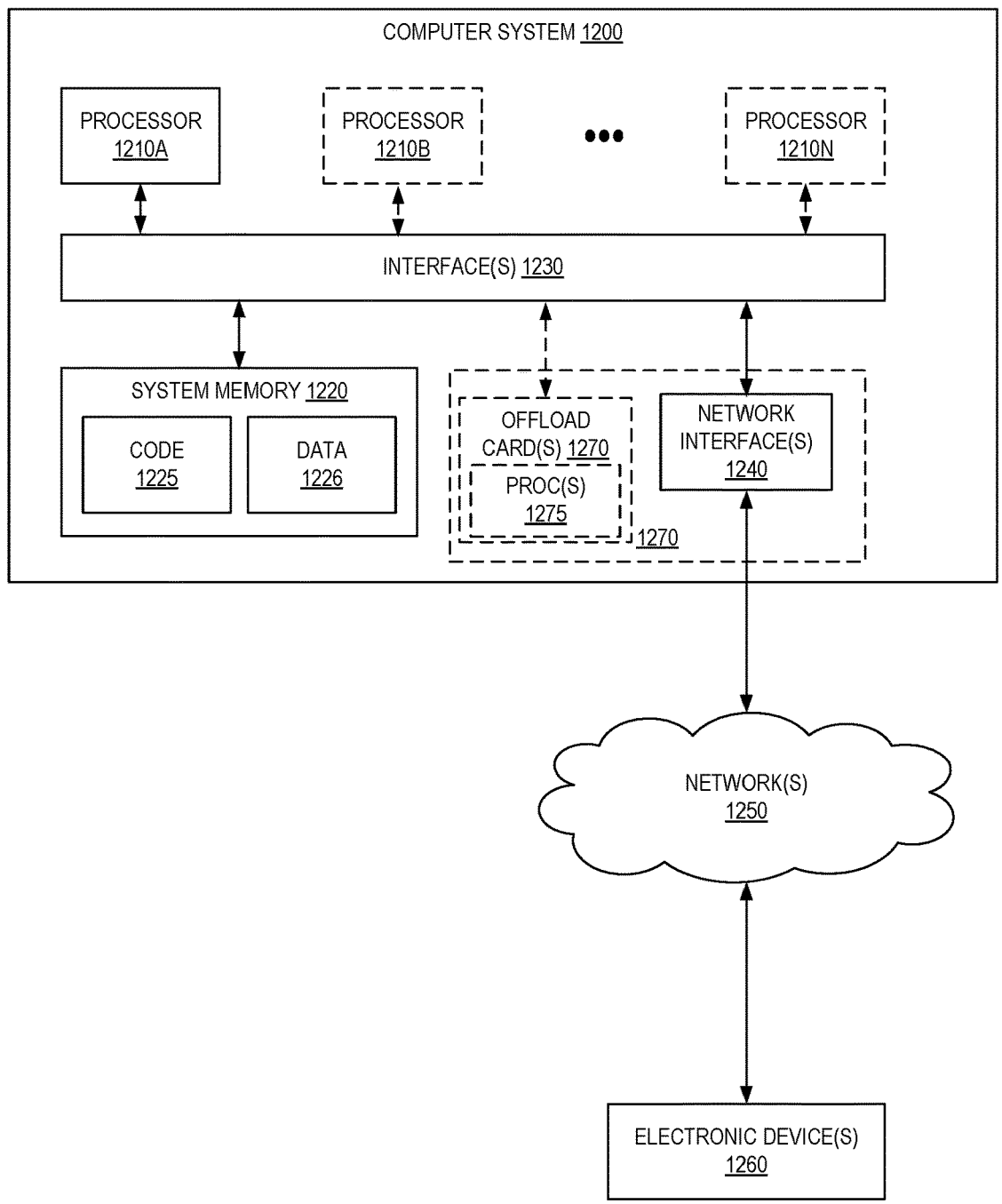
FIG. 12 is a block diagram illustrating an example computer system that may be used in some embodiments.

In some embodiments, a system that implements a portion or all of the techniques as described herein may include a general-purpose computer system that includes or is configured to access one or more computer-accessible media, such as computer system 1200 illustrated in FIG. 12. In the illustrated embodiment, computer system 1200 includes one or more processors 1210 coupled to a system memory 1220 via an input/output (I/O) interface 1230. Computer system 1200 further includes a network interface 1240 coupled to I/O interface 1230. While FIG. 12 shows computer system 1200 as a single computing device, in various embodiments a computer system 1200 may include one computing device or any number of computing devices configured to work together as a single computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1210 may commonly, but not necessarily, implement the same ISA.

System memory 1220 may store instructions and data accessible by processor(s) 1210. In various embodiments, system memory 1220 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1220 as code 1225 and data 1226.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as other computer systems or devices as illustrated in FIG. 1, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1200 includes one or more offload cards 1270 (including one or more processors 1275, and possibly including the one or more network interfaces 1240) that are connected using an I/O interface 1230 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1200 may act as a host electronic device (e.g., operating as part of a hardware virtualization service) that hosts compute instances, and the one or more offload cards 1270 execute a virtualization manager that can manage compute instances that execute on the host electronic device. As an example, in some embodiments the offload card(s) 1270 can perform compute instance management operations such as pausing and/or un-pausing compute instances, launching and/or terminating compute instances, performing memory transfer/copying operations, etc. These management operations may, in some embodiments, be performed by the offload card(s) 1270 in coordination with a hypervisor (e.g., upon a request from a hypervisor) that is executed by the other processors 1210A-1210N of the computer system 1200. However, in some embodiments the virtualization manager implemented by the offload card(s) 1270 can accommodate requests from other entities, and may not coordinate with (or service) any hypervisor.

In some embodiments, system memory 1220 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Figure 13:
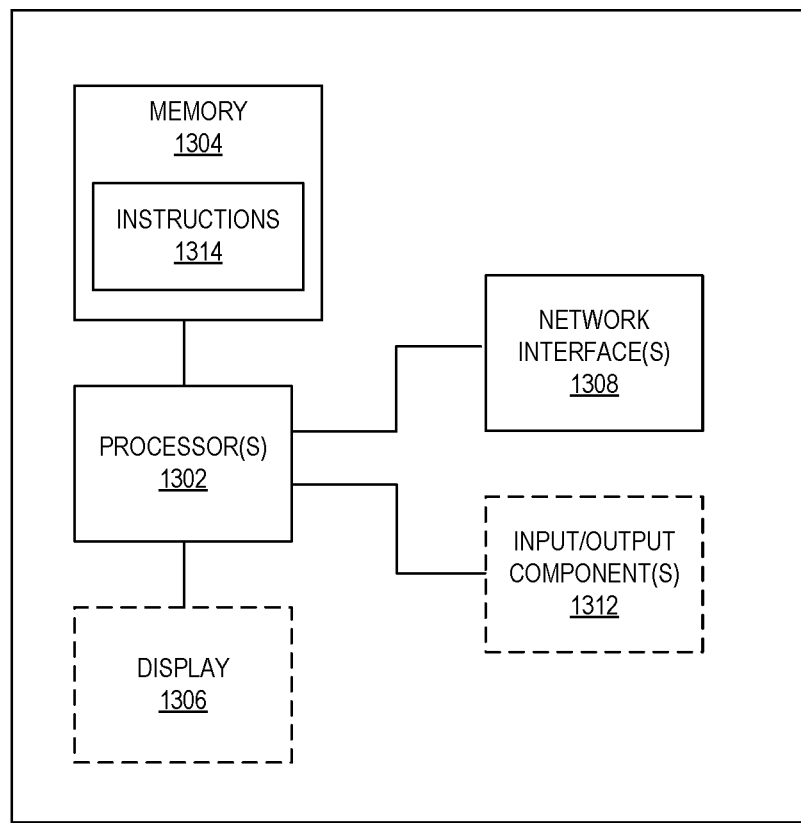
FIG. 13 illustrates a logical arrangement of a set of general components of an exemplary computing device that can be utilized in accordance with various embodiments.

FIG. 13 illustrates a logical arrangement of a set of general components of an example computing device 1300 such as the web services provider 119, etc. Generally, a computing device 1300 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1302 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1304) to store code (e.g., instructions 1314) and/or data, and a set of one or more wired or wireless network interfaces 1308 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1304) of a given electronic device typically stores code (e.g., instructions 1314) for execution on the set of one or more processors 1302 of that electronic device. One or more parts of various embodiments may be implemented using different combinations of software, firmware, and/or hardware.

A computing device 1300 can include some type of display element 1306, such as a touch screen or liquid crystal display (LCD), although many devices such as portable media players might convey information via other means, such as through audio speakers, and other types of devices such as server end stations may not have a display element 1306 at all. As discussed, some computing devices used in some embodiments include at least one input and/or output component(s) 1312 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 14:
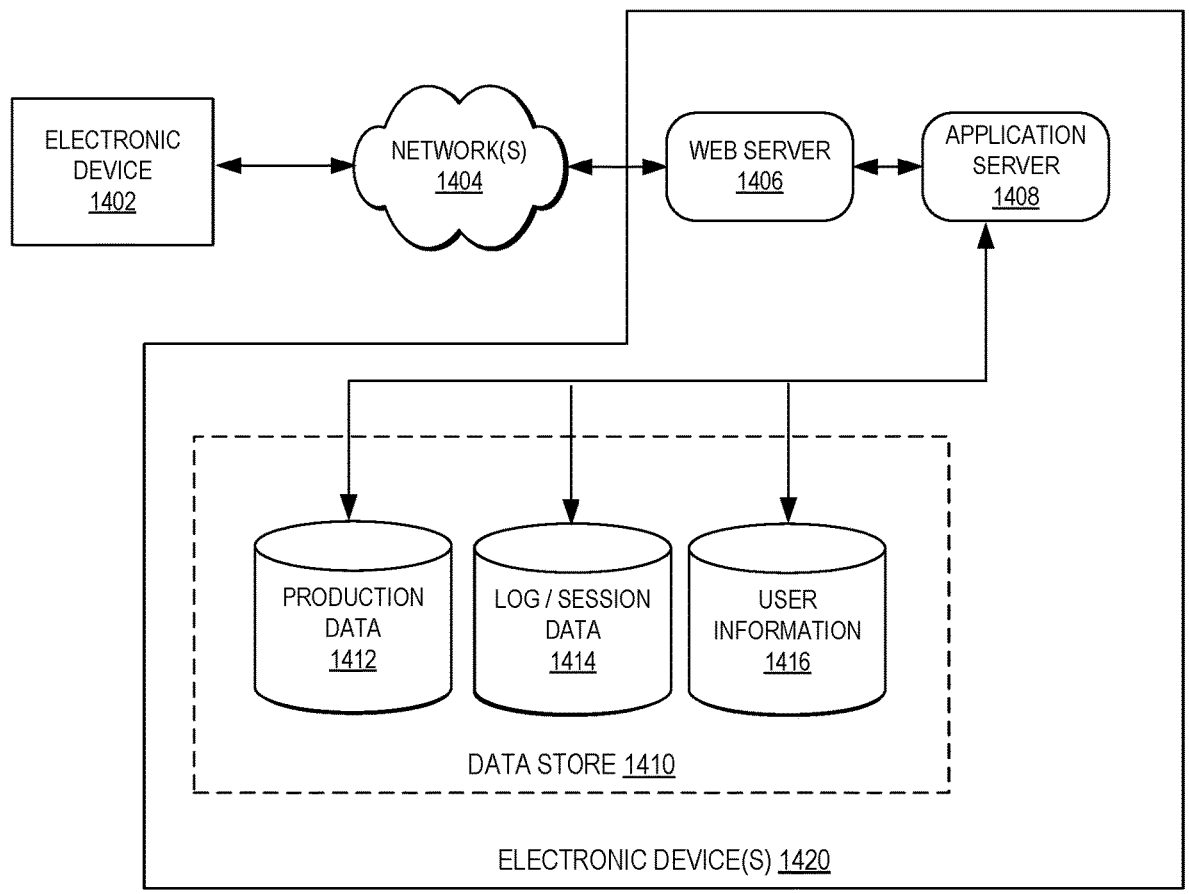
FIG. 14 illustrates an example of an environment for implementing aspects in accordance with various embodiments.

As discussed, different approaches can be implemented in various environments in accordance with the described embodiments. For example, FIG. 14 illustrates an example of an environment 1400 for implementing aspects in accordance with various embodiments. For example, in some embodiments the requests detailed above are HyperText Transfer Protocol (HTTP) requests that are received by a web server (e.g., web server 1406), and the users, via electronic devices, may interact with the provider network via a web portal provided via the web server 1406 and application server 1408. As will be appreciated, although a web-based environment is used for purposes of explanation, different environments may be used, as appropriate, to implement various embodiments. The system includes an electronic client device 1402, which may also be referred to as a client device and can be any appropriate device operable to send and receive requests, messages or information over an appropriate network 1404 and convey information back to a user of the device 1402. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1404 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1404 includes the Internet, as the environment includes a web server 1406 for receiving requests and serving content in response thereto, although for other networks an alternative device serving a similar purpose could be used, as would be apparent to one of ordinary skill in the art.

The illustrative environment includes at least one application server 1408 and a data store 1410. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1408 can include any appropriate hardware and software for integrating with the data store 1410 as needed to execute aspects of one or more applications for the client device 1402 and handling a majority of the data access and business logic for an application. The application server 1408 provides access control services in cooperation with the data store 1410 and is able to generate content such as text, graphics, audio, video, etc., to be transferred to the client device 1402, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1402 and the application server 1408, can be handled by the web server 1406. It should be understood that the web server 1406 and application server 1408 are not required and are merely example components, as structured code discussed herein can be executed on any appropriate device or host machine as discussed elsewhere herein.

The data store 1410 can include several separate data tables, databases, or other data storage mechanisms and media for storing data relating to a particular aspect. For example, the data store illustrated includes mechanisms for storing production data 1412 and user information 1416, which can be used to serve content for the production side. The data store 1410 also is shown to include a mechanism for storing log or session data 1414. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update, or otherwise process data in response thereto. In one example, a user might submit a search request for a certain type of item. In this case, the data store 1410 might access the user information 1416 to verify the identity of the user and can access a production data 1412 to obtain information about items of that type. The information can then be returned to the user, such as in a listing of results on a web page that the user is able to view via a browser on the user device 1402. Information for a particular item of interest can be viewed in a dedicated page or window of the browser.

The web server 1406, application server 1408, and/or data store 1410 may be implemented by one or more electronic devices 1420, which can also be referred to as electronic server devices or server end stations, and may or may not be located in different geographic locations. Each of the one or more electronic devices 1420 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the environment 1400 in FIG. 14 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   publishing, by a web services provider, a plurality of machine learning items to a hosted machine learning repository, wherein each published machine learning item is available to a third-party requester, wherein each published machine learning item includes a name of the published machine learning item, an indication of a category that the published machine learning item belongs to, and an input format for the published machine learning item, wherein the plurality of machine learning items comprises one or more of:
      a machine learning pipeline;
      a machine learning algorithm;
      a machine learning model;
      a container image; or
      a notebook;
   receiving, from the third-party requester, a request to use one of the plurality of published machine learning items; and
   providing, by the web services provider, access to the requested one of the plurality of published machine learning items.

2. The computer-implemented method of claim 1, further comprising:
   receiving, by the web services provider, an additional machine learning item from a producer to share with other users with access to the hosted machine learning repository; and
   publishing the additional machine learning item to the hosted machine learning repository.

3. The computer-implemented method of claim 1, wherein the requested one of the plurality of published machine learning items is to be executed as a part of a pipeline of machine learning models.

4. The computer-implemented method of claim 1, wherein the hosted machine learning repository is hosted by the web services provider.

5. The computer-implemented method of claim 1, wherein the providing access to the requested one of the plurality of published machine learning items further comprises:
   obtaining access rights information from a user account associated with the third-party requester; and
   determining the access for the third-party requester based on the access rights information.

6. The computer-implemented method of claim 1, further comprising:
   receiving a request to allocate resources to be used by the requested one of the plurality of machine learning items; and
   utilizing the allocated resources to perform a task using the requested one of the plurality of machine learning items.

7. The computer-implemented method of claim 6, wherein the task is one of training and inference.

8. The computer-implemented method of claim 1, wherein each of the published machine learning items is a container.

9. The computer-implemented method of claim 1, wherein at least one of the published machine learning items was generated from code that was provided to the web services provider.

10. The computer-implemented method of claim 9, wherein at least one of the published machine learning items was containerized.

11. The computer-implemented method of claim 1, further comprising:
    adding the one of the published machine learning items as part of a pipeline.

12. The computer-implemented method of claim 1, wherein the request to use one of the plurality of published machine learning items is received via an Application Programming Interface (API) of the web services provider.

13. A computer-implemented method comprising:
    publishing, by a web services provider, a plurality of machine learning items to a hosted machine learning repository, wherein each published machine learning item is available to a third-party requester, wherein each published machine learning item includes a name of the published machine learning item, an indication of a category that the published machine learning item belongs to, and an input format for the published machine learning item, wherein the plurality of machine learning items comprises one or more of:
       a machine learning pipeline;
       a machine learning algorithm;
       a machine learning model;
       a container image; or
       a notebook;
    receiving a request for a machine learning item from the third-party requester, the request for the machine learning item indicating at least a category of the machine learning item;
    determining a suggestion of at least one published machine learning item based on the request for the machine learning item;
    providing the suggestion of the at least one published machine learning item to the requester; and
    providing, by the web services provider, access to the requested one of the plurality of published machine learning items.

14. The computer-implemented method of claim 13, further comprising:
    receiving a request to allocate resources to use at least one of the suggested published machine learning items from the third-party requester; and
    utilizing the allocated resources to perform a task using the selected at least one suggested published machine learning items.

15. The computer-implemented method of claim 13, wherein each of the published machine learning items is a container and the allocated resources are virtual machines executing on hardware that are to execute the container.

16. A system comprising:
    a hosted machine learning repository; and
    a web services provider to:
       publish a plurality of machine learning items to the hosted machine learning repository, wherein each published machine learning item is available to a third-party requester, wherein each published machine learning item includes a name of the published machine learning item, an indication of a category that the published machine learning item belongs to, and an input format for the published machine learning item;

receive an additional machine learning item to share with other users with access to the hosted machine learning repository;

publish the additional machine learning item to the hosted machine learning repository; and provide access to the additional machine learning item to the other users with access to the hosted machine learning repository.

17. The system of claim 16, wherein each of the published machine learning items is a container and the allocated resources are virtual machines executing on hardware that are to execute the container.

18. The system of claim 16, wherein the plurality of machine learning items comprises one or more of:
a machine learning pipeline;
a machine learning algorithm;
a machine learning model;
a container image; or
a notebook.

19. The system of claim 16, wherein the hosted machine learning repository is hosted by the web services provider.

20. The system of claim 16, wherein each of the published machine learning items is a container.

* * * * *